Figure 1:
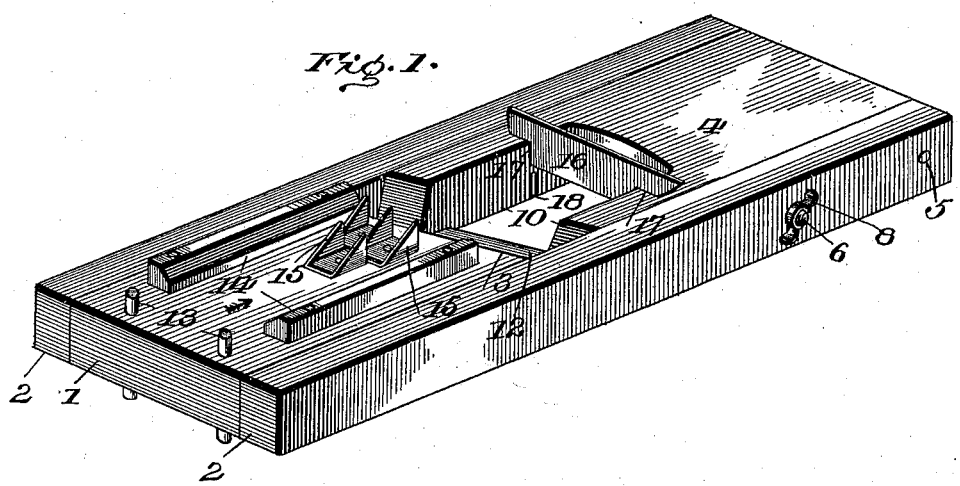

(No Model.) 2 Sheets—Sheet 1.

A. LEHMANN.
COMBINATION KITCHEN TOOL.

No. 598,792. Patented Feb. 8, 1898.

Witnesses
Inventor
A. Lehmann
by R. S. & A. B. Lacey
His Attorneys (No Model.) 2 Sheets—Sheet 2.

A. LEHMANN.
COMBINATION KITCHEN TOOL.

No. 598,792. Patented Feb. 8, 1898.

Witnesses
Inventor
A. Lehmann
by his Attorneys

THE NORRIS PETERS CO., PHOTO-LITHO., WASHINGTON, D. C.

UNITED STATES PATENT OFFICE.

ADOLPH LEHMANN, OF MOOREFIELD, OHIO, ASSIGNOR OF ONE-HALF TO FRANK F. SHILLING, OF TIRO, OHIO.

COMBINATION KITCHEN-TOOL.

SPECIFICATION forming part of Letters Patent No. 598,792, dated February 8, 1898.

Application filed June 17, 1897. Serial No. 641,122. (No model.)

*To all whom it may concern:*

Be it known that I, ADOLPH LEHMANN, a citizen of the United States, residing at Moorefield, in the county of Harrison and State of Ohio, have invented certain new and useful Improvements in Combination Kitchen-Tools; and I do hereby declare the following to be a full, clear, and exact description of the invention, such as will enable others skilled in the art to which it appertains to make and use the same.

My invention has relation to an improved culinary utensil; and the object is to provide a simple, cheap, and convenient implement of this class for preparing sweet corn for food or table use.

To this end the novelty consists in the construction, combination, and arrangement of the same, as will be hereinafter more fully described, and particularly pointed out in the claim.

In the accompanying drawings the same reference characters indicate the same parts of the invention.

Figure 2:
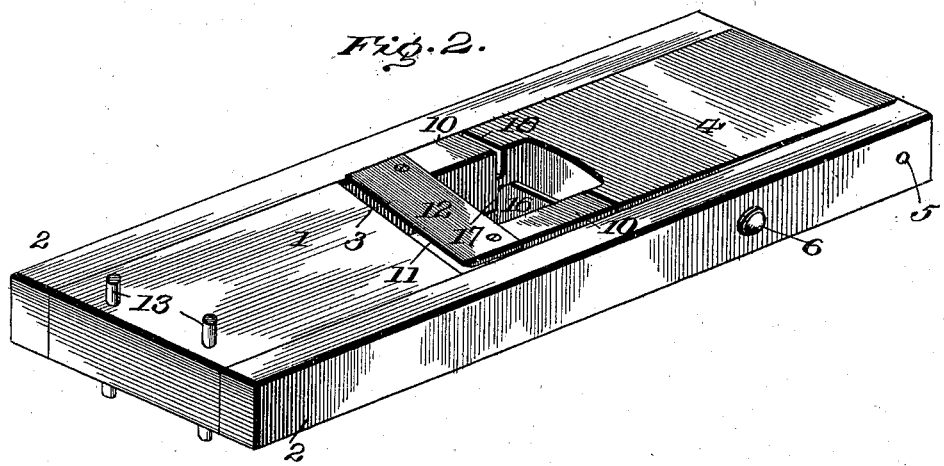
Figure 3:
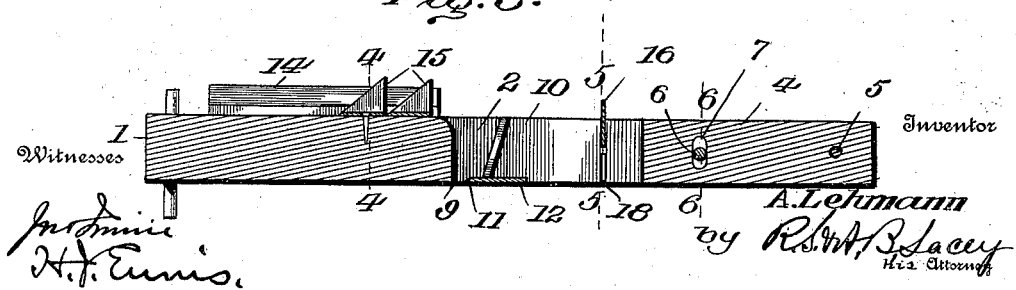
Figure 4:
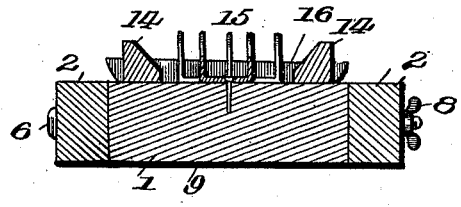
Figure 5:
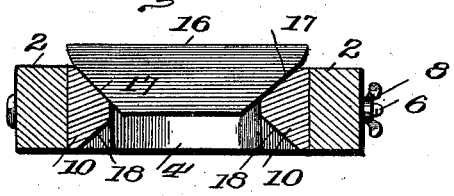
Figure 6:
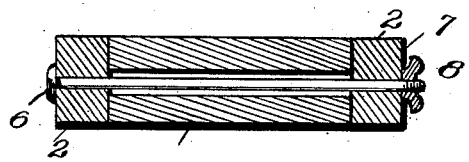
Figure 7:
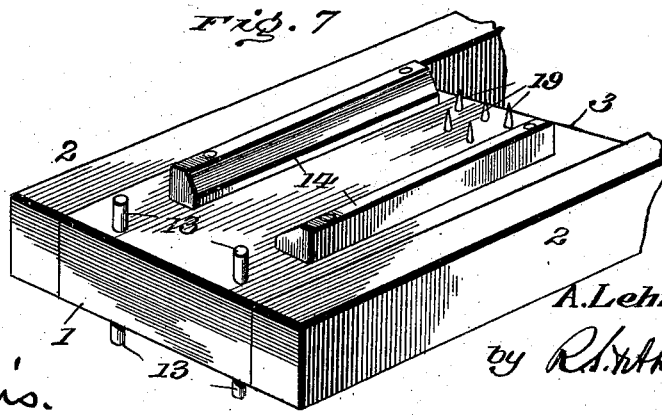

Figure 1 is a perspective view of my improved culinary utensil. Fig. 2 is a similar view of the obverse side. Fig. 3 is a longitudinal section. Fig. 4 is a transverse section on the line 4 4 of Fig. 3. Fig. 5 is a similar view on the line 5 5 of Fig. 3. Fig. 6 is a similar view on the line 6 6 of Fig. 3. Fig. 7 is a modification of the openers.

1 represents the base-board, rigidly fixed between the parallel side rails 2 2 and having its inner end terminating in a transversely diagonal beveled edge 3.

4 represents a longitudinal platform transversely pivoted on the rod 5 between the outer ends of the side rails.

6 represents a thumb-screw which extends transversely through the side rails 2 2 and through an enlarged orifice 7 in the platform 4, and its outer end is provided with a thumb-nut 8, by means of which the platform may be adjustably clamped between the side rails.

It will be observed by reference to Fig. 6 that the thumb-screw snugly fits the rails 2 2, while the orifice 7 in the platform 4, through which said thumb-screw passes, is sufficiently large to permit considerable vertical adjustment of the inner end of said platform with reference to the plane of the face 9 of the base-board 1, with the rod 5 forming the pivoted point for the outer end of said platform.

The inner end of the platform terminates in two parallel arms 10 10 of unequal length to permit the cutting edge 11 of a blade 12, removably secured thereto, to be adjusted parallel to the diagonal edge 3 of the base-board.

13 13 represent pins or studs which project through on each side of the outer end of the base-board 1 to hold the same in place on the bowl or other suitable vessel on which it may be placed when in use.

14 14 represent longitudinal parallel triangular guide-ribs fixed on one face of the base-board 1, and 15 15 represent a parallel series of rearwardly-inclined opener-blades fixed to the face of the base-board parallel with and between the guide-ribs 14 14.

16 represents a transverse scraper-blade removably secured in the alined slot 17 17 in the parallel arms 10 10 of the adjustable platform 4, and the opposite sides of said arms are likewise provided with corresponding alined slots 18 18 to receive said scraper-blade when it is desired to use it on that side of the implement.

Having fully described the construction of the device, I will proceed to explain the manner of using the same.

In preparing the corn for table use the device is placed in the position shown in Fig. 1, and an ear of green corn properly prepared by removing the husk and silk is drawn in the direction of the arrow between the guide-ribs 14 14 and in the path of the opener-blades 15, which cut the grains longitudinally with the ear, and when the opened grains reach the scraper 16 the pulp falls out and drops through the opening between the arms 10 10, while the hull or chaff remains attached to the cob. The operation is very thoroughly and expeditiously performed, and as the milk and pulp only are used the nutritive properties alone are secured, the refuse being retained on the cob. Corn thus treated may be prepared in a variety of ways, and, as is well known, is acceptable to a stomach which would reject or at least one which the whole grain would cause discomfort.

In the modification I have shown the opener-blades 15 15 replaced by a series of correspondingly-arranged pointed pins 19 19, which tear open the hulls to expose the pulp to the action of the scraper.

In preparing the green corn for drying, the diagonal cutter-blade 12 is adjusted so as to project slightly above the edge 3 of the base-board 1, so that in drawing the ear along in the path of the blade the caps are removed from the grains and the ear then subjected to the action of hot water or steam to coagulate the milk. The blade 12 is then depressed so that its cutting edge lies below the plane of the upper face of the base-board, and the scraper 16 adjusted in the slots 18 18, and the ear with the uncapped corn drawn across it, as in the first instance. This operation removes the pulp containing the coagulated milk, leaving the hulls or refuse matter adhering to the cob. The pulp is then dried or "evaporated" in the usual manner, and when so treated may be preserved indefinitely, the product so prepared being far superior as an article of diet to that dried in the hull.

In addition to the uses thus described the device will be found very convenient for slicing potatoes and apples or, in fact, any fruit or vegetables, as well as dried meats, for table use.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A reversible combination kitchen-tool, comprising two parallel side rails, a platform 1 at one end of the tool and fixed to said rails, a depressible platform 4 at the other end of the tool and bifurcated at its inner end to form a clearance-opening and parallel arms 10 provided on the under side thereof with transverse retaining-slots, a cutter-blade secured to the under side of said bars, a scraper-blade 16 adapted to rest on the upper side of said arms or in the slots in the under side thereof, longitudinally-extending guide-ribs 14 on the upper side of the fixed platform, and cutting devices for opening corn-grains disposed between said ribs adjoining the inner end of the said fixed platform, substantially as described.

In testimony whereof I affix my signature in presence of two witnesses.

ADOLPH LEHMANN.

Witnesses:
D. A. HOLLINGSWORTH,
J. M. SCHRIEBER.